United States Patent
Hernandez-Vazquez

(10) Patent No.: US 12,442,473 B1
(45) Date of Patent: Oct. 14, 2025

(54) NON-ROUND PLUG AND SEAL WITH RADIAL OFFSET CAPABILITIES

(71) Applicant: Freudenberg-NOK General Partnership, Plymouth, MI (US)

(72) Inventor: Eduardo Hernandez-Vazquez, Fishers, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 18/757,677

(22) Filed: Jun. 28, 2024

(51) Int. Cl.
  *F16L 25/14* (2006.01)
  *F16L 25/12* (2006.01)

(52) U.S. Cl.
  CPC .............. *F16L 25/14* (2013.01); *F16L 25/12* (2013.01)

(58) Field of Classification Search
  CPC ............ F16L 47/18; F16L 25/12; F16L 25/14
  See application file for complete search history.

(56) References Cited

U.S. PATENT DOCUMENTS

| | | | |
|---|---|---|---|
| 9,388,921 B2 | 7/2016 | Unger et al. | |
| 10,788,150 B2 | 9/2020 | Parsley et al. | |
| 2009/0072494 A1* | 3/2009 | Smith | F16L 25/14 |
| 2014/0091532 A1* | 4/2014 | Unger | F16L 25/14 |
| 2023/0296197 A1* | 9/2023 | Baier | F16L 25/14 |

FOREIGN PATENT DOCUMENTS

| | | | | |
|---|---|---|---|---|
| BE | 1023218 B1 | * | 1/2017 | |
| DE | 8629175 U1 | | 5/1987 | |
| EP | 2325937 A1 | | 5/2011 | |
| EP | 2385276 A1 | * | 11/2011 | F16L 25/14 |
| FR | 3101919 A1 | | 4/2021 | |
| JP | 2012255470 A | | 12/2012 | |

* cited by examiner

*Primary Examiner* — Zachary T Dragicevich
(74) *Attorney, Agent, or Firm* — Daniel J. Sepanik, Esq.; Harness, Dickey & Pierce, P.L.C.

(57) ABSTRACT

A seal for connecting between oval cross-section pipe sections includes an oval shaped tubular insert having two flat wall sections connected to one another by two end curved sections. The oval-shaped tubular insert has a pair of ends with a passage extending through the pair of ends. An elastomeric over-mold is provided on an exterior of the oval-shaped tubular insert. The elastomeric over-mold includes a pair of raised seal beads each surrounding a respective one of the pair of ends. The pair of raised beads have a first bead thickness in a radial direction along the two flat wall sections and a gradually increasing bead thickness from the ends of the flat wall sections to a center of the two end curved sections.

19 Claims, 4 Drawing Sheets

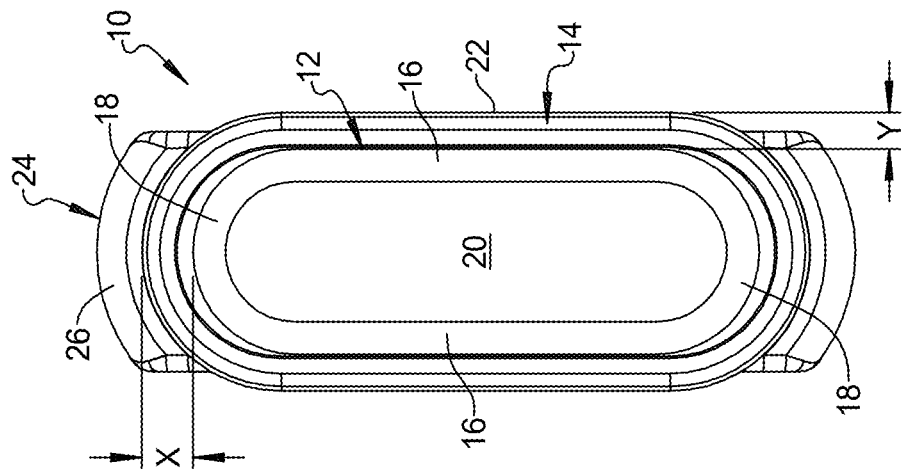
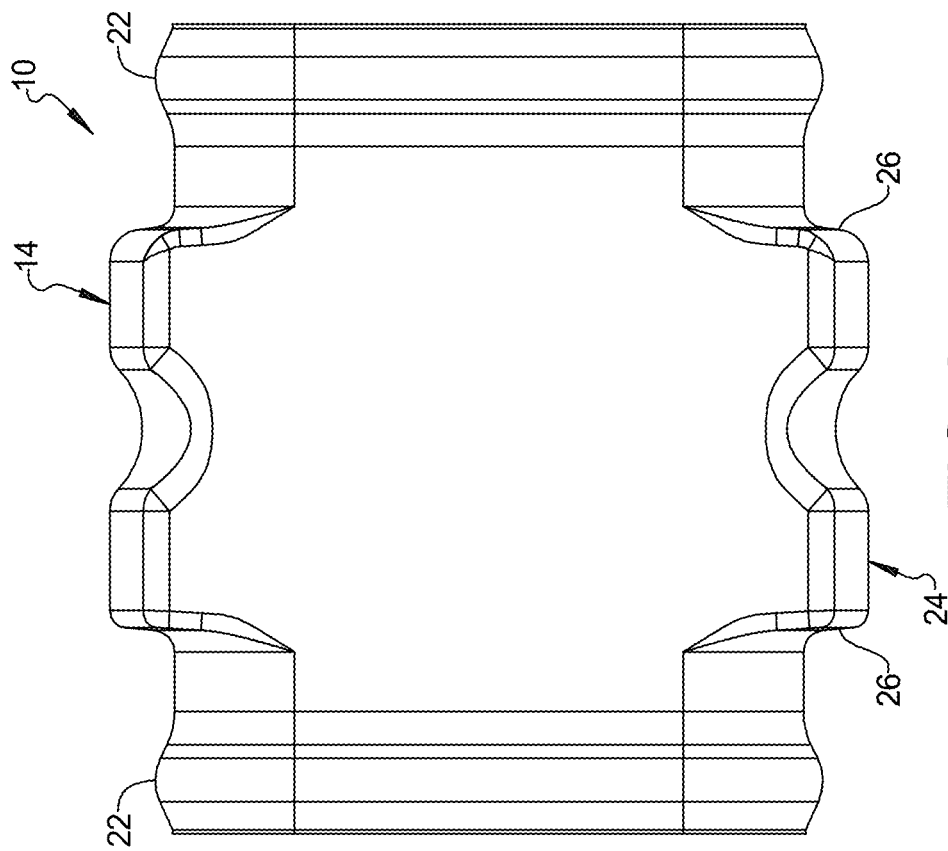

NON-ROUND PLUG AND SEAL WITH RADIAL OFFSET CAPABILITIES

FIELD

The present disclosure relates to a non-round plug and seal with radial offset capabilities.

BACKGROUND

This section provides background information related to the present disclosure which is not necessarily prior art.

Plug & seals are rubber-coated pipe sections that create a safe, leak-free connection between housings. A secure solution for the transport of air, water, oils and other fluids, they can combine several functions in a single component and compensate for misalignment and tolerance variations.

One of the main values of the plug & seal connector design is its capability to seal and compensate axial offset or misalignment between two bores as it has a continuous over-molded bead of rubber at each end of a tubular insert, but this capability is possible only when the bores to seal have a fully circular section, as the round geometry bore allow to maintain a constant gap to the round pipe for the seal along the allowed offset.

The challenge for the current plug & seal technology is the max fluid flow capacity being limited to the largest circular section available, because as described above it requires a constant section to maintain its capability to compensate the offset between connecting bores. Newer applications, specifically for electric vehicles, require managing similar or higher flow of fluid volume as in internal combustion engines but within highly constrained spaces.

It is desirable in the art to develop a plug & seal for connecting two members have a bore geometry that is oval-shaped. It is also desirable for the design to maintain the same offset ability as for an all-round plug & seal designs.

SUMMARY

This section provides a general summary of the disclosure and is not a comprehensive disclosure of its full scope or all of its features.

According to an aspect of the present disclosure, a seal for connecting between oval cross-section pipe sections includes an oval-shaped tubular insert having two flat wall sections connected to one another by two end curved sections. The oval-shaped tubular insert has a pair of ends with a passage extending through the pair of ends. An elastomeric over-mold is provided on an exterior of the oval-shaped tubular insert. The elastomeric over-mold includes a pair of raised seal beads each surrounding a respective one of the pair of ends. The pair of raised beads have a first bead thickness in a radial direction along the two flat wall sections and a gradually increasing bead thickness from the ends of the flat wall sections to a center of the two end curved sections.

According to a further aspect of the present disclosure, the elastomeric over-mold includes a central stopper shoulder disposed between the pair of ends.

According to a further aspect of the present disclosure, the central stopper shoulder is on each of the two end curved sections.

According to a further aspect of the present disclosure, the central stopper shoulder includes two shoulders each extending away from the oval-shaped tubular insert and each facing in a direction of a different one of the pair of ends of the oval-shaped tubular insert.

According to a further aspect of the present disclosure, the oval-shaped tubular insert is made from metal.

According to a further aspect of the present disclosure, the oval-shaped tubular insert is made from aluminum.

According to a further aspect of the present disclosure, the oval-shaped tubular insert is made from plastic.

According to a further aspect of the present disclosure, the elastomeric over-mold is made from one of FKM, EPDM and HNBR.

According to a further aspect of the present disclosure, a bead thickness at a center of the two end curved sections is at least 20% greater than the first bead thickness.

According to another aspect of the present disclosure, a pipe system includes a pair of oval pipes each having an oval cross-section and an open end. A seal is connected between the open ends of the pair of oval pipes. The seal includes an oval-shaped tubular insert having two flat wall sections connected to one another by two end curved sections. The oval-shaped tubular insert has a pair of ends with a passage extending through the pair of ends. An elastomeric over-mold is provided on an exterior of the oval-shaped tubular insert. The elastomeric over-mold has a pair of raised seal beads each surrounding a respective one of the pair of ends. The pair of raised beads have a first bead thickness in a radial direction along the two flat wall sections and a gradually increasing bead thickness from the ends of the flat wall sections to a center of the two end curved sections.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 2 is a side plan view of the plug & seal according to the principles of the present disclosure;

FIG. 3 is an end plan view of the plug & seal according to the principles of the present disclosure;

Corresponding reference numerals indicate corresponding parts throughout the several views of the drawings.

DETAILED DESCRIPTION

Example embodiments will now be described more fully with reference to the accompanying drawings.

Figure 1:
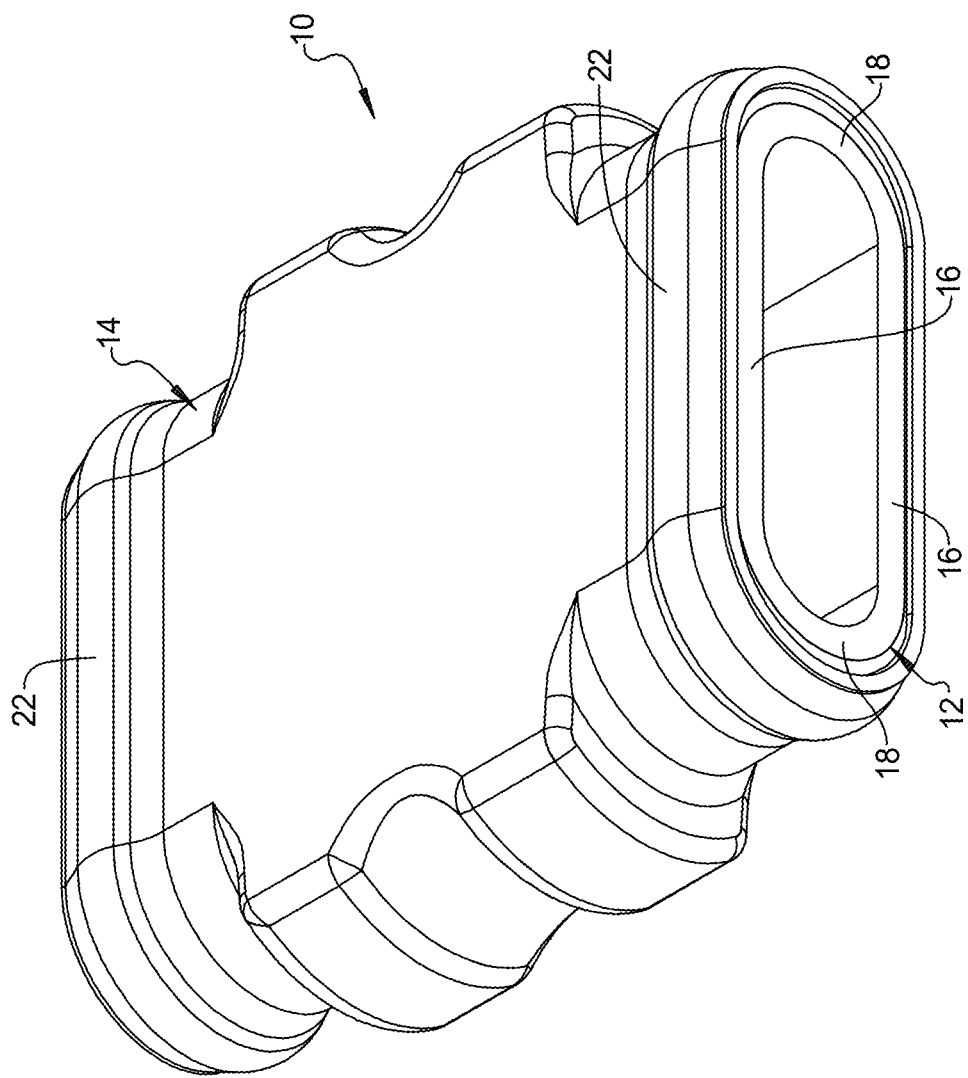
FIG. 1 is a perspective view of a plug & seal according to the principles of the present disclosure.
Figure 5:
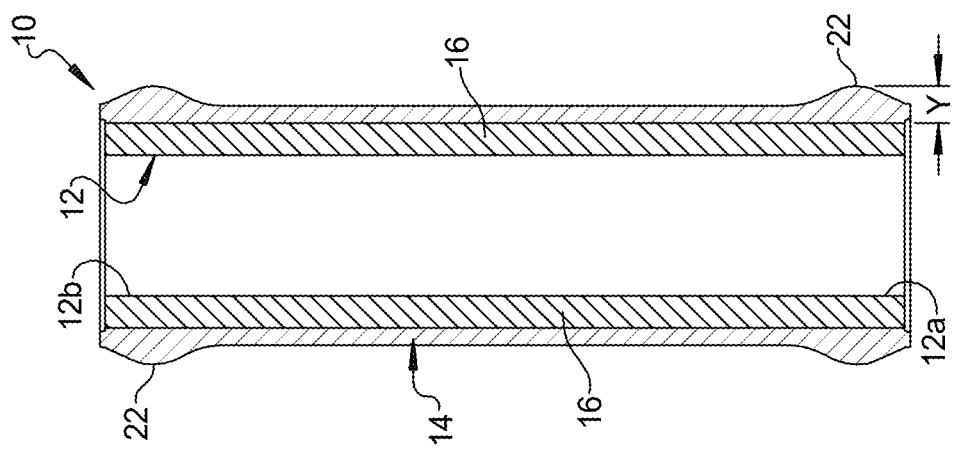
FIG. 5 is a cross-sectional view of the plug & seal taken along line 5-5 of FIG. 2.
Figure 4:
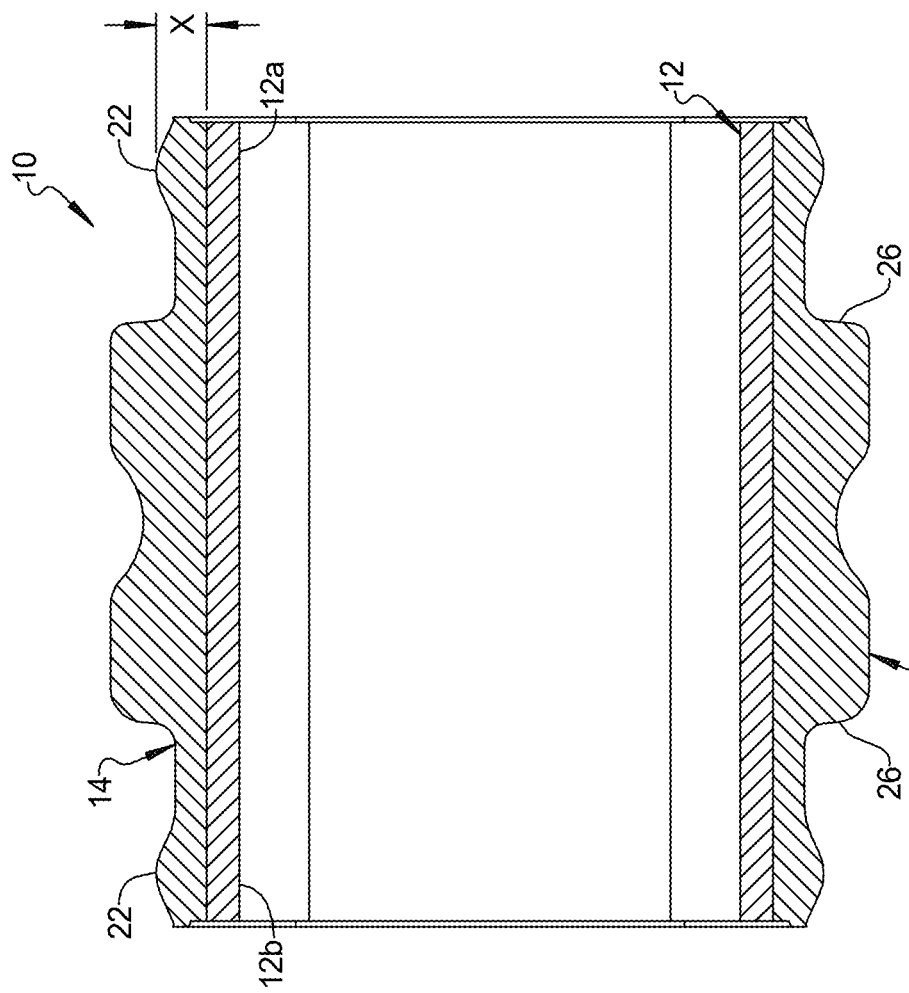
FIG. 4 is a cross-sectional view of the plug & seal taken along line 4-4 of FIG. 3.

With reference to FIGS. 1-5, a non-round plug & seal 10 according to the principles of the present disclosure will now be described. As shown in FIGS. 4 and 5, the non-round plug & seal 10 includes an oval-shaped tubular insert 12 and an over-mold 14. The oval-shaped tubular insert 12 has two flat wall sections 16 connected to one another by two end curved sections 18. The oval-shaped tubular insert 12 has a pair of open ends 12a, 12b with a passage 20 extending through the pair of open ends 12a, 12b. The oval-shaped tubular insert 12 can be made from metal including, but not limited to, steel and aluminum or from plastic.

The over-mold 14 can be made from an elastomeric material that can include, but is not limited to, fluorine kautschuk material (FKM), ethylene propylene diene monomer rubber (EPDM) and hydrogenated nitrile butadiene rubber (HNBR). The over-mold 14 substantially covers an entire outer surface of the oval-shaped tubular insert 12. The elastomeric over-mold 14 includes a pair of raised seal beads 22 each surrounding a respective one of the pair of ends 12a, 12b. The pair of raised beads 22 have a first bead thickness Y in a radial direction along the two flat wall sections 16 and a gradually increasing bead thickness X from the ends of the flat wall sections 16 to a center of the two end curved sections 18. The variable seal bead thickness X>Y along the geometry allows for compensation of the strain change along the slot geometry during offset. According to the present disclosure, the bead thickness X at a center of the two end curved sections can be between 10% and 40% larger than the thickness Y. According to a still further embodiment, the bead thickness is at least 20% greater than the first bead thickness Y. The pair of raised seal beads 22 can have a rounded cross section.

The elastomeric over-mold 14 includes a central stopper 24 disposed between the pair of ends 12a, 12b. The central stopper 24 extends radially outward from each of the two end curved sections 18. The central stopper 24 includes two shoulders 26 each extending radially away from the oval-shaped tubular insert and each facing in a direction of a different one of the pair of ends 12a, 12b of the oval-shaped tubular insert 12. The central stopper 24 can be molded to limit insertion if there is no counterbore.

Figure 6:
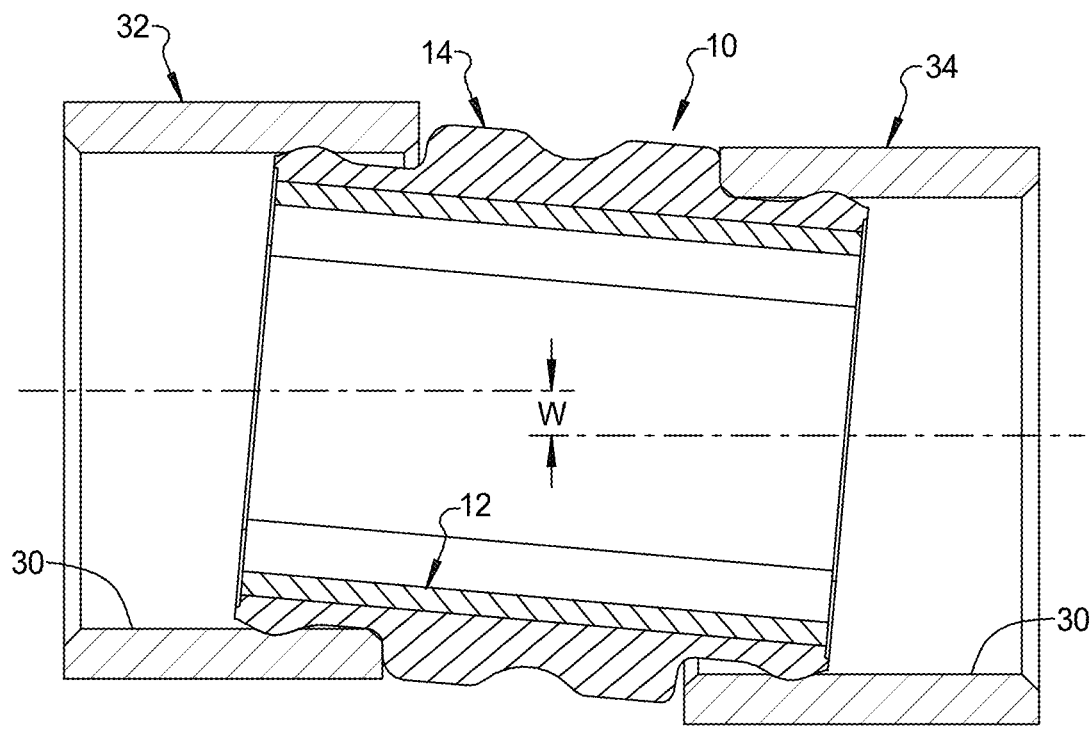
FIG. 6 is a cross-sectional view of the plug & seal connecting between widthwise misaligned or offset bores of two opposing members.
Figure 7:
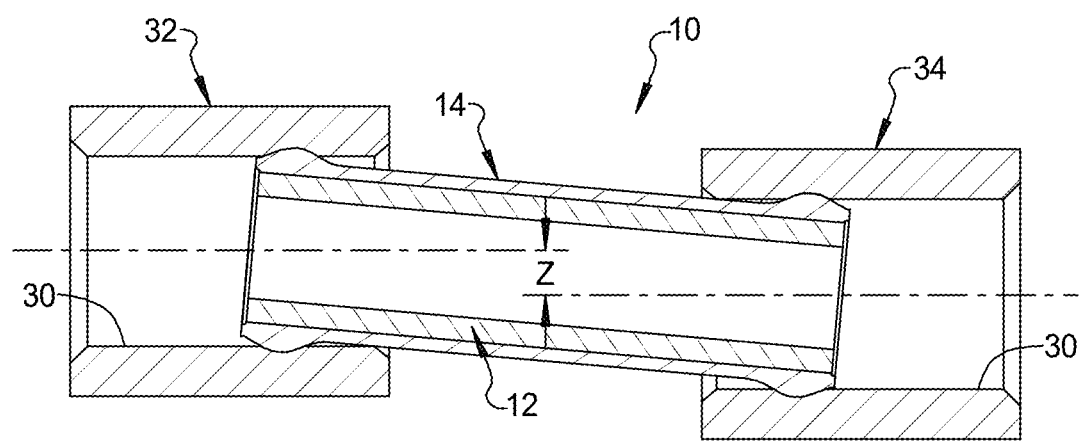
FIG. 7 is a cross-sectional view of the plug & seal connecting between laterally misaligned or offset bores of two opposing members.

With reference to FIGS. 6 and 7, the plug & seal 10 is shown connected between two opposing oval-shaped bores 30 of members 32 and 35. As shown in FIG. 6, the bores 30 can be offset widthwise by distance W or, as shown in FIG. 7, the bores 30 can be offset laterally by distance Z and the plug & seal 10 can accommodate this offset on each axis for oval shaped bores 30.

The present disclosure provides a seal geometry design that maintains the sealing capacity capable to compensate the variation of section for a given radial misalignment or offset for oval-shaped geometries, while maintaining similar axial and radial offset capabilities.

The solution for this new design is rather than pursue an even compression of the seal along the whole assembly perimeter, as on current circular plug & seal design guidelines, to include a non-continuous bead thickness for oblong sections. Having a variable bead thickness compensates for a loss of contact pressure on the ends but maintains an acceptable max strain in the flat sections.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plug & seal for connecting between oval cross-section pipe sections, comprising:
   an oval-shaped tubular insert having two flat wall sections connected to one another by two end curved sections, the oval-shaped tubular insert having a pair of ends with a passage extending through the pair of ends; and
   an elastomeric over-mold on an exterior of the oval-shaped tubular insert, the elastomeric over-mold having a pair of raised seal beads each surrounding a respective one of the pair of ends, wherein the pair of raised beads have a first bead thickness in a radial direction along the two flat wall sections and a gradually increasing second bead thickness from the ends of the flat wall sections to a center of the two end curved sections.

2. The plug & seal according to claim 1, wherein the elastomeric over-mold includes a central stopper shoulder disposed between the pair of ends.

3. The plug & seal according to claim 2, wherein the central stopper shoulder is on each of the two end curved sections.

4. The plug & seal according to claim 2, wherein the central stopper shoulder includes two shoulders each extending away from the oval-shaped tubular insert and each facing in a direction of a different one of the pair of ends of the oval-shaped tubular insert.

5. The plug & seal according to claim 1, wherein the oval-shaped tubular insert is made from metal.

6. The plug & seal according to claim 5, wherein the oval-shaped tubular insert is made from aluminum.

7. The plug & seal according to claim 1, wherein the oval-shaped tubular insert is made from plastic.

8. The plug & seal according to claim 1, wherein the elastomeric over-mold is made from one of fluorine kautschuk material (FKM), ethylene propylene diene monomer rubber (EPDM) and hydrogenated nitrile butadiene rubber (HNBR).

9. The plug & seal according to claim 1, wherein the second bead thickness at a center of the two end curved sections is at least 20% greater than the first bead thickness.

10. A pipe system, comprising:
    a pair of oval pipes each having an oval cross-section and an open end; and
    a plug & seal for connecting between the open ends of the pair of oval pipes, the seal including an oval-shaped tubular insert having two flat wall sections connected to one another by two end curved sections, the oval-shaped tubular insert having a pair of ends with a passage extending through the pair of ends, and an elastomeric over-mold on an exterior of the oval-shaped tubular insert, the elastomeric over-mold having a pair of raised seal beads each surrounding a respective one of the pair of ends, wherein the pair of raised beads have a first bead thickness in a radial direction along the two flat wall sections and a gradually increasing second bead thickness from the ends of the flat wall sections to a center of the two end curved sections.

11. The pipe system according to claim 10, wherein the elastomeric over-mold includes a central stopper shoulder disposed between the pair of ends.

12. The pipe system according to claim 11, wherein the central stopper shoulder is on each of the two end curved sections.

13. The pipe system according to claim 11, wherein the central stopper shoulder includes two shoulders each extending away from the oval-shaped tubular insert and each facing in a direction of a different one of the pair of ends of the oval-shaped tubular insert.

14. The pipe system according to claim 11, wherein the central stopper shoulder extends away from the oval-shaped tubular insert.

15. The pipe system according to claim 10, wherein the oval-shaped tubular insert is made from metal.

16. The pipe system according to claim 15, wherein the oval-shaped tubular insert is made from aluminum.

17. The pipe system according to claim 10, wherein the oval-shaped tubular insert is made from plastic.

18. The pipe system according to claim 10, wherein the elastomeric over-mold is made from one of fluorine kautschuk material (FKM), ethylene propylene diene monomer rubber (EPDM) and hydrogenated nitrile butadiene rubber (HNBR).

19. The pipe system according to claim 10, wherein the second bead thickness at a center of the two end curved sections is at least 20% greater than the first bead thickness.

* * * * *